(12) United States Patent
Kim et al.

(10) Patent No.: US 10,237,048 B2
(45) Date of Patent: Mar. 19, 2019

(54) METHOD AND APPARATUS FOR SCHEDULING DATA IN A WIRELESS COMMUNICATION SYSTEM

(71) Applicant: Samsung Electronics Co., Ltd., Suwon-si, Gyeonggi-do (KR)

(72) Inventors: Young-Bum Kim, Seoul (KR); Gert Jan Van Lieshout, Staines (GB); Yong-Jun Kwak, Yongin-si (KR); Jeong-Ho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 15/334,718

(22) Filed: Oct. 26, 2016

(65) Prior Publication Data

US 2017/0118743 A1 Apr. 27, 2017

(30) Foreign Application Priority Data

Oct. 26, 2015 (KR) ........................ 10-2015-0148882

(51) Int. Cl.
*H04L 5/14* (2006.01)
*H04W 72/12* (2009.01)

(52) U.S. Cl.
CPC ........... *H04L 5/14* (2013.01); *H04W 72/1289* (2013.01)

(58) Field of Classification Search
CPC ........................... H04L 5/14; H04W 72/1289
See application file for complete search history.

(56) References Cited

U.S. PATENT DOCUMENTS

| 2010/0232285 | A1 | 9/2010 | Lee et al. | |
| 2012/0275405 | A1 | 11/2012 | Kim et al. | |
| 2013/0242882 | A1* | 9/2013 | Blankenship | H04W 72/042 370/329 |
| 2014/0126505 | A1* | 5/2014 | Chun | H04L 5/0053 370/329 |
| 2014/0376498 | A1 | 12/2014 | Kim et al. | |
| 2015/0003384 | A1* | 1/2015 | Kawasaki | H04W 72/042 370/329 |
| 2015/0103715 | A1 | 4/2015 | Chen et al. | |

FOREIGN PATENT DOCUMENTS

WO 2010/094579 A1 8/2010

\* cited by examiner

*Primary Examiner* — Jae Y Lee
(74) *Attorney, Agent, or Firm* — Jefferson IP Law, LLP

(57) ABSTRACT

A method and an apparatus for scheduling data in a wireless communication system are provided. The method includes checking first control information in a first subframe, checking a first block including second control information and first data based on the first control information in the first subframe, and decoding the first data based on the second control information in the first subframe. The first control information includes resource allocation information related to the first block, and the second control information includes one of channel state information about the first data, or resource allocation information related to a second block in a second subframe.

20 Claims, 11 Drawing Sheets

METHOD AND APPARATUS FOR SCHEDULING DATA IN A WIRELESS COMMUNICATION SYSTEM

CROSS-REFERENCE TO RELATED APPLICATION(S)

This application claims the benefit under 35 U.S.C. § 119(a) of a Korean patent application filed on Oct. 26, 2015 in the Korean Intellectual Property Office and assigned Ser. No. 10-2015-0148882, the entire disclosure of which is hereby incorporated by reference.

TECHNICAL FIELD

The present disclosure relates to a method and apparatus for scheduling data in a wireless communication system.

BACKGROUND

To satisfy demands for wireless data traffic, which have been increasing since commercialization of a $4^{th}$ generation (4G) communication system, efforts have been made to develop an improved $5^{th}$ generation (5G) or pre-5G communication system. That is why the 5G or pre-5G communication system is referred to as a beyond 4G network communication system or a post long term evolution (LTE) system. To achieve high data rates, deployment of the 5G communication system in a millimeter wave (mmWave) band (i.e., a 60-GHz band) is under consideration. In order to mitigate propagation path loss and increase a propagation distance in the mmWave band, beamforming, massive multiple input multiple output (MIMO), full dimensional MIMO (FD-MIMO), array antenna, analog beamforming, and large-scale antenna technology have been discussed for use in the 5G communication system. Further, to improve a system network, techniques such as an evolved small cell, an advanced small cell, a cloud radio access network (cloud RAN), an ultra-dense network, device-to-device (D2D) communication, a wireless backhaul, a moving network, cooperative communication, a coordinated multi-point (CoMP), and an interference cancellation have been developed for the 5G communication system. Besides, advanced coding modulation (ACM) techniques such as hybrid frequency shift keying (FSK) and quadrature amplitude modulation (QAM) (FQAM) and sliding window superposition coding (SWSC), and advanced access techniques such as filter bank multi carrier (FBMC) and non-orthogonal multiple access (NOMA), and sparse code multiple access (SCMA) have been developed for the 5G communication system.

The Internet is evolving from a human-oriented connection network in which human beings generate and consume information to the Internet of things (IoT) in which information is transmitted/received and processed between distributed elements such as things. The Internet of everything (IoE) technology is emerging, which combines the IoT with big data processing through connectivity to a cloud server and the like. For IoT implementation, technologies such as sensing, wired/wireless communication and network infrastructure, service interfacing, and security are required. Currently, techniques including a sensor network for interconnection between things, machine to machine (M2M) communication, and machine type communication (MTC) are being studied. An intelligent Internet technology (IT) service of creating new values for human beings by collecting and analyzing data generated from interconnected things may be provided in an IoT environment. The IoT may find IoT applications in a wide range of fields including a smart home, a smart building, a smart city, a smart car or a connected car, a smart grid, health care, a smart appliance, and a state-of-the art medical service, through convergence between existing IT technologies and various industries.

In this context, many attempts have been made to apply the 5G communication system to the IoT. For example, techniques such as a sensor network, M2M communication, and MTC are implemented by means of beamforming, MIMO, array antennas, and the like for 5G communication. Application of cloud RAN as the afore-described big data processing technique is an example of convergence between 5G technology and IoT technology.

To process the recently ever-increasing mobile data traffic, the 5G system after the LTE (or an evolved universal mobile telecommunications system (UMTS) terrestrial radio access (E-UTRA)) and LTE-advanced (LTE-A) (or E-UTRA Evolution) systems is under active discussion. While a system bandwidth per carrier is limited to up to 20 MHz in the legacy LTE and LTE-A systems, the 5G system seeks to provide ultra-high-rate data service at up to a few Gbps in an ultra-wide band much wider than in the legacy LTE and LTE-A systems. Since it is difficult to secure the ultra-wide band frequency in a frequency band spanning hundreds of MHz to a few GHz, an ultra-high frequency band of a few GHz or tens of GHz is considered as a candidate operating frequency band for the 5G system.

Waves in the ultra-high frequency band have a wavelength of a few mm and thus are called an mmWave. In the ultra-high-frequency band, however, the pathloss of waves increases in proportion to a frequency band, resulting in the coverage of a mobile communication system.

To overcome the shortcoming of reduced coverage, beamforming is emerging as important because the beamforming increases the propagation distance of waves by focusing the radiation energy of waves onto a predetermined target spot through a plurality of antennas. Beamforming is applicable to each of a transmitter and a receiver. In addition to coverage extension, beamforming offers the benefit of interference mitigation in areas other than a beamforming direction. To implement beamforming appropriately, accurate measurement of a transmission/reception beam and a feedback method are needed.

Another requirement for the 5G system is ultra-low latency service with a transmission delay of more or less 1 ms. As a method for reducing a transmission latency, a short transmission time interval (TTI)-based frame structure needs to be designed, compared to a frame structure in the LTE and LTE-A systems. A TTI is a basic scheduling unit. In the legacy LTE and LTE-A systems, a TTI is 1 ms, the length of one subframe. For example, 0.5 ms, 0.2 ms, 0.1 ms, and the like is available as a shorter TTI than in the LTE and LTE-A systems to satisfy the requirement of the ultra-low latency service in the 5G system. Unless otherwise mentioned, the terms TTI and subframe are interchangeably used in the sense that they represent a predetermined time interval as a basic scheduling unit.

Now, the LTE and LTE-A systems will be described with reference to the attached drawings, and a design sought for the 5G system will also be described.

FIG. 1 illustrates a basic structure of a radio resource area, that is, a time-frequency resource area, which carries data or a control channel in the legacy LTE and LTE-A systems according to the related art.

Referring to FIG. 1, a horizontal axis represents time, and a vertical axis represents frequency.

Uplink (UL) refers to a radio link through which a user equipment (UE) transmits data or a control signal to an evolved node B (eNB), and downlink (DL) refers to a radio link through which an eNB transmits data or a control signal to a UE. In the LTE and LTE-A systems, a minimum time unit is an orthogonal frequency division multiplexing (OFDM) symbol on DL and a single carrier frequency division multiple access (SC-FDMA) symbol on UL. One slot 106 includes $N_{symb}$ symbols 102, and one subframe 105 includes two slots. A slot is 0.5 ms long, and a subframe is 1.0 ms long. A radio frame 114 is a time unit including 10 subframes. A minimum frequency unit is a subcarrier of 15 kHz, and a total system transmission bandwidth covers $N_{BW}$ subcarriers 104.

A basic resource unit in the time-frequency domain is a resource element (RE) 112, represented by an OFDM symbol or SC-FDMA symbol index and a subcarrier index. A resource block (RB) or physical RB (PRB) 108 is defined by $N_{symbol}$ consecutive OFDM symbols 102 in time by $N_{RB}$ consecutive subcarriers 110 in frequency. Therefore, one RB 108 includes $N_{symb} \times N_{RB}$ REs 112. In the LTE and LTE-A systems, data is mapped in units of an RB, and an eNB schedules a specific UE in units of an RB pair included in one subframe. The number of SC-FDMA or OFDM symbols, $N_{symb}$ is determined according to the length of a cyclic prefix (CP) added to each symbol in order to prevent interference. For example, $N_{symb}$ is 7 in the case of a normal CP, and $N_{symb}$ is 6 in the case of an extended CP. $N_{BW}$ and $N_{RB}$ are proportional to a system transmission bandwidth. A data rate increases for a UE in proportion to the number of RBs scheduled for the UE.

FIG. 2 illustrates a method for mapping a control channel and a data channel to a time-frequency resource area as defined above in the LTE and LTE-A systems according to the related art.

Referring to FIG. 2, the horizontal axis represents time and the vertical axis represents frequency. In the LTE and LTE-A systems, a basic scheduling unit is a subframe 201. In general, an eNB determines whether to schedule a UE in each subframe and transmits on a data channel and a control channel carrying scheduling information about the data channel to the UE according to the determination. The control channel is generally mapped to the first one to three OFDM symbols of a subframe in time and to a total system bandwidth 202 in frequency, as indicated by reference numeral 203. Therefore, the UE may complete processing of the control channel as early as possible, and frequency diversity may be maximized. As a consequence, the reception performance of the control channel is increased. The data channel scheduled by the control channel is mapped to the symbol following the last symbol of the control channel to the last symbol of the subframe in time and to a range within the system bandwidth in frequency according to the scheduling determination of the eNB, as indicated by reference numeral 204. Accordingly, the UE should be capable of always receiving a signal across the total system bandwidth irrespective of the size of a frequency area occupied by an actually scheduled data channel. Although it does not matter with UE implementation in the LTE or LTE-A system having a relatively narrow system bandwidth 202, the complexity of UE implementation may increase excessively in the 5G system with an ultra-wide system bandwidth 202. For example, UEs supporting only a partial bandwidth (a subband 205) within a 5G system bandwidth which does not increase complexity relatively may be introduced in the early deployment stage of the 5G system in order to proliferate 5G UEs as fast as possible. If a 5G control channel is distributed across the system bandwidth as in the legacy LTE and LTE-A systems, the 5G UEs supporting only the subband cannot receive the 5G control channel.

As a result, the 5G UEs supporting only the subband cannot use the radio resources of an area 206, which is inefficient. Likewise, if a channel occupying the total system bandwidth is defined as in the legacy LTE and LTE-A system, limitations may be imposed on efficient resource use of future-introduced various 5G services. That is, forward compatibility is limited.

FIG. 3 illustrates a hybrid automatic repeat request (HARQ) feedback timing in a legacy LTE and LTE-A systems according to the related art.

Referring to FIG. 3, LTE and LTE-A systems may support frequency division duplex (FDD) and time division duplex (TDD).

Different frequencies are used for DL and UL in FDD, whereas a common frequency is used for DL and UL and a UL signal and a DL signal are distinguished from each other in time in TDD.

In TDD, a DL signal or a UL signal is transmitted separately on a subframe basis. Accordingly, various TDD UL-DL configurations are defined so that a time area may be divided equally into UL and DL subframes, more DL subframes may be allocated, or more UL subframes are allocated, according to traffic loads.

In an FDD LTE or LTE-A system, if an eNB transmits a data channel and a related control channel in subframe #n 301 to a UE, the UE transmits an HARQ acknowledgment/negative acknowledgment (ACK/NACK) feedback indicating whether the data channel has been received successfully in subframe #n+4 302 to the eNB.

On the other hand, in a TDD LTE or LTE-A system, an HARQ ACK/NACK feedback timing corresponding to each subframe is defined for each TDD UL-DL configuration.

HARQ ACK/NACK feedback timings may additionally be defined according to support or non-support of carrier aggregation (CA) and combinations. In other words, implementation complexity may be increased due to various HARQ ACK/NACK feedback timings.

Further, an eNB transmits DL data and scheduling information to UEs. In a general wireless communication system, information about an outband signal carrying control information mapped to radio resources separately from data in each subframe should be acquired. Consequently, overhead is increased.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a scheduling method and apparatus for a user equipment (UE) in a mobile communication system.

Another aspect of the present disclosure is to provide a scheduling method and apparatus for preventing an overhead increase caused by acquisition of information of an outband signal in each subframe.

In accordance with another aspect of the present disclosure, a method for scheduling data in a wireless communication system is provided. The method includes checking first control information in a first subframe, checking a first block including second control information and first data based on the first control information in the first subframe, and decoding the first data based on the second control information in the first subframe. The first control information includes resource allocation information related to the first block, and the second control information includes one of channel state information about the first data, or resource allocation information related to a second block in a second subframe.

In accordance with another aspect of the present disclosure, an apparatus for scheduling data in a wireless communication system is provided. The apparatus includes a transceiver configured to transmit or receive data, at least one processor configured to check first control information in a first subframe, and check a first block including second control information and first data based on the first control information in the first subframe, and a decoder configured to decode the first data based on the second control information in the first subframe. The first control information includes resource allocation information related to the first block, and the second control information includes one of channel state information about the first data, or resource allocation information related to a second block in a second subframe.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
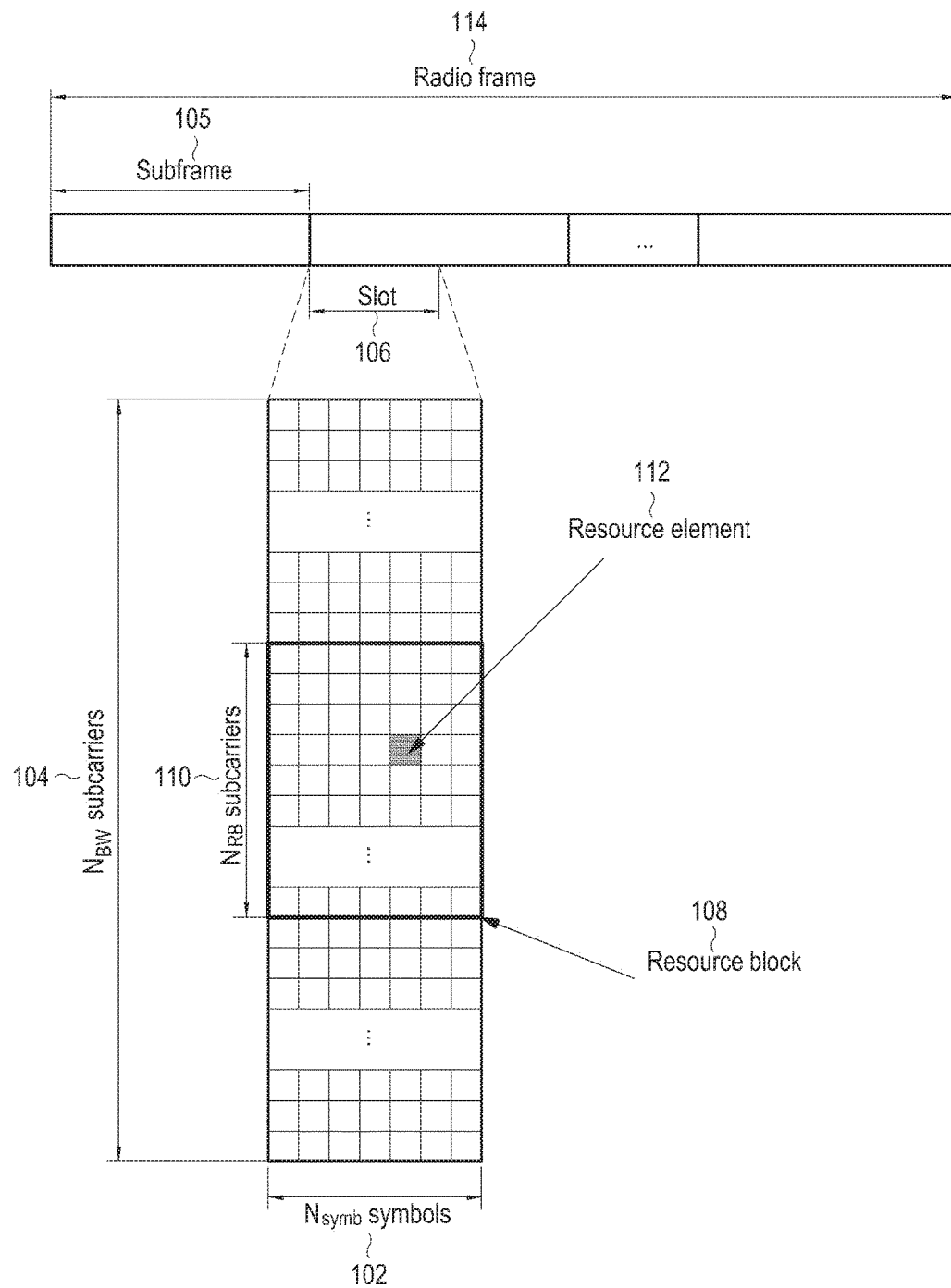
FIG. 1 illustrates a basic structure of a time-frequency resource area as a radio resource area carrying data or a control channel in legacy long term evolution (LTE) and LTE-advanced (LTE-A) systems according to the related art.
Figure 2:
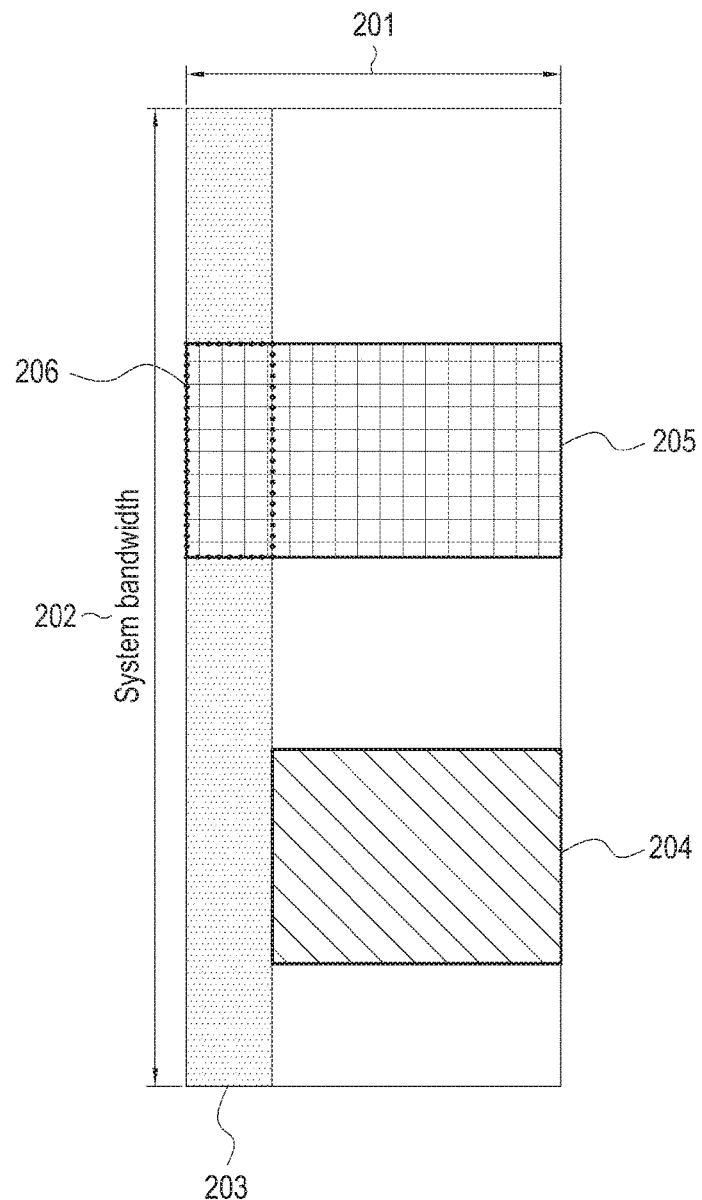
FIG. 2 illustrates a method for mapping a control channel and a data channel to a time-frequency resource area in the legacy LTE and LTE-A systems according to the related art.
Figure 3:
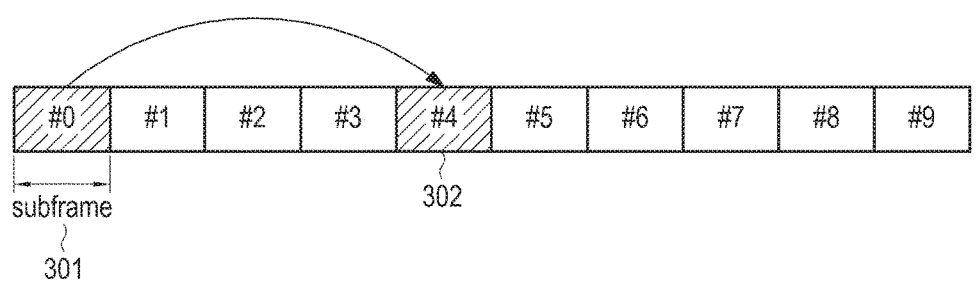
FIG. 3 illustrates a hybrid automatic repeat request (HARQ) feedback timing in legacy LTE and LTE-A systems according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the term 'have', 'may have', 'include', or 'may include' signifies the presence of a specific feature, number, operation, component, or part, or their combination, not excluding the presence or addition of one or more other features, numbers, operations, components, or parts, or a combination thereof.

Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

A base station (BS) as used herein is an entity that allocates resources to a terminal. The BS may be at least one of a node B, an evolved node B (eNB), a wireless access unit, a base station controller (BSC), or a network node. Also, the term terminal may cover a user equipment (UE), a mobile station (MS), a cellular phone, a smartphone, a computer, a multimedia system having communication functionality, and the like.

In the present disclosure, downlink (DL) is a radio transmission path in which an eNB transmits a signal to a UE, and uplink (UL) is a radio transmission path in which a UE transmits a signal to an eNB. Various embodiments of the present disclosure are applicable to communication systems having a similar technical background or channel structure. Further, various embodiments of the present disclosure may be applied to other communication systems through some modification made without departing from the scope of the present disclosure by those skilled in the art.

As described before, compared to the legacy long term evolution (LTE) and LTE-advanced (LTE-A) systems, a 5$^{th}$ generation (5G) system needs to ensure forward compatibility to efficiently support various 5G services which will be introduced in the future, and improve the complexity of transmission and reception timings to reduce the complexity of UE and system implementation.

A scheduling method and an operation for transmitting and receiving a control channel and a data channel which will overcome the above-described problems are defined below.

Figure 4:
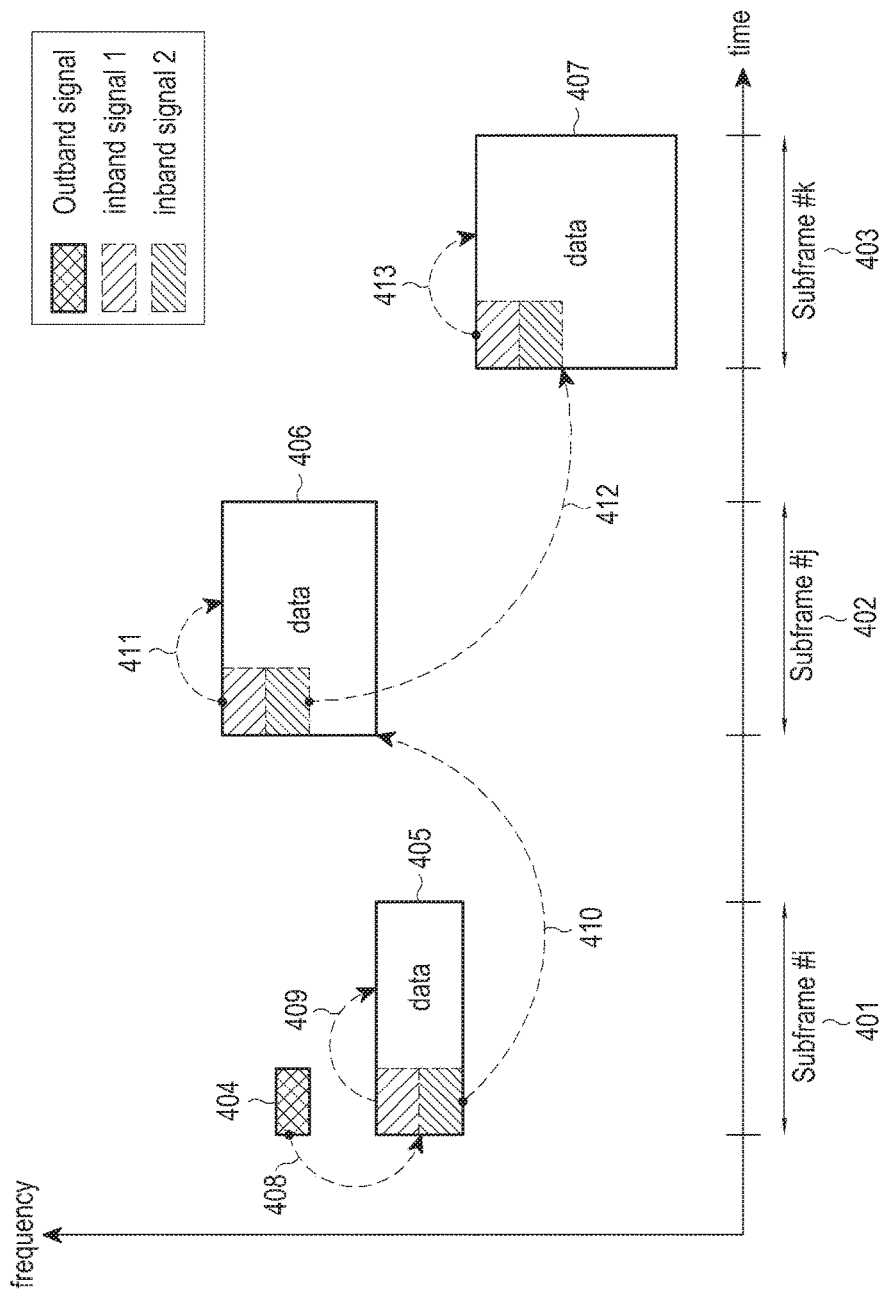
FIG. 4 is a conceptual view of transmission of downlink data and scheduling information from an evolved node B (eNB) to a user equipment (UE) in a wireless communication system according to an embodiment of the present disclosure.

FIG. 4 is a conceptual view of transmission of DL data and scheduling information from an eNB to a UE in a wireless communication system according to an embodiment of the present disclosure.

Referring to FIG. 4, the horizontal axis represents time and the vertical axis represents frequency. Basically, DL data directed to a UE and scheduling information about the DL data are multiplexed in the same radio resources, prior to transmission. Control information multiplexed with data in the same radio resources is defined as an inband signal. On the other hand, control information mapped to radio resources, separately from data is defined as an outband signal.

Referring to FIG. 4, it is assumed that a subframe #i 401, a subframe #j 402, and a subframe #k 403 exist along the time axis. Obviously, the subframe #i 401, the subframe #j 402, and the subframe #k 403 may or may not be contiguous.

If an eNB is to transmit DL data to a UE in the subframe #i 401, the eNB transmits, to the UE, resource allocation control information about radio resources (referred to as second radio resources) 405 mapped to the DL data and an inband signal by an outband signal, as indicated by reference numeral 408. Radio resources (referred to as first radio resources) 404 mapped to the outband signal are known to both the eNB and the UE by preliminary agreement, to thereby reduce the reception complexity of the outband signal at the UE. The inband signal multiplexed with the data in the second radio resources of subframe #i delivers the following control information.

1) A first inband signal includes, but not limited to, hybrid automatic repeat request (HARQ)-related control information and modulation and coding scheme (MCS) information about the data transmitted in subframe #i, as indicated by reference numeral 409.

2) A second inband signal includes, but not limited to, resource allocation control information about second radio resources to which data or an inband signal transmitted in subframe #j (j>i) is mapped.

Therefore, the UE may acquire radio resource information 406 about data to be received in subframe #j from the eNB from subframe #i in advance, as indicated by reference numeral 410. As a consequence, the UE may receive the DL data without acquiring (or detecting) an additional outband signal in subframe #j, thereby reducing the reception complexity of the UE and the signaling overhead of the system. On the other hand, since there are no limitations on data transmission for other UEs in an area other than the radio resources 406 for the data and the inband signal transmitted in subframe #j to the UE, forward compatibility is ensured.

Likewise, the inband signal multiplexed with the data in subframe #j includes, for example, a first inband signal and a second inband signal.

The first inband signal includes HARQ-related control information and MCS information about the data transmitted in the same subframe, as indicated by reference numeral 411. The second inband signal includes resource allocation information about second radio resources 407 mapped to data or an inband signal transmitted in subframe #k 403 (k>j), as indicated by reference numeral 412. The eNB may control the first and second inband signals transmitted in subframe #j, referring to control information such as channel state information (CSI) and an HARQ ACK/NACK, as indicated by reference numeral 413, fed back from the UE until before subframe #j.

Figure 5:
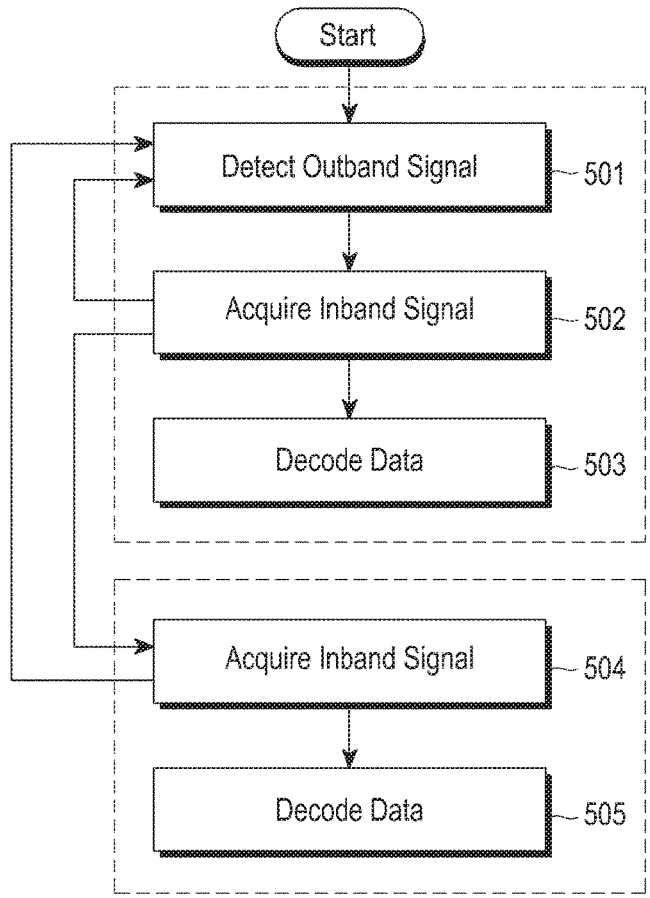
FIG. 5 is a flowchart illustrating an operation for receiving data from an eNB by a UE in a wireless communication system according to an embodiment of the present disclosure.

FIG. 5 is a flowchart illustrating an operation for receiving data from an eNB by a UE in a wireless communication system according to an embodiment of the present disclosure.

Referring to FIG. 5, the UE attempts to receive an outband signal in first radio resources preset between the UE and the eNB in operation 501. If the UE succeeds in receiving the outband signal, the UE receives an inband signal in second radio resources indicated by the outband signal in operation 502. On the contrary, if the UE fails to receive the outband signal, the UE performs operation 501 in the next subframe. Upon successful decoding of the inband signal received in operation 502, the UE decodes DL data based on control information of the inband signal in operation 503. If the UE fails in decoding the inband signal received in operation 502, the UE returns to operation 501.

Operations 501, 502, and 503 are all performed in the same subframe (subframe #i). Then, the UE may feedback HARQ acknowledgement/negative acknowledgement (ACK/NACK) control information to the eNB according to the data decoding result in operation 503. In subframe #j, the UE receives an inband signal in radio resources indicated by the inband signal received in operation 502 from the eNB in operation 504. Or the UE may determine whether the inband signal of the previous subframe (subframe #i) has been received, in subframe #j in operation 504.

If the UE succeeds in decoding the inband signal received in operation 504, the UE decodes DL data according to control information of the inband signal in operation 505. If the UE fails to decode the inband signal received in operation 502, the UE returns to operation 501.

Both operations 504 and 505 are performed in the same subframe (subframe #j). Then, the UE may feedback HARQ ACK/NACK control information to the eNB according to the data decoding result in operation 505. If the UE fails to decode the inband signal received in operation 504, the UE returns to operation 501.

A detailed operation of the present disclosure will be described in a specific embodiment of the present disclosure.

Figure 6:
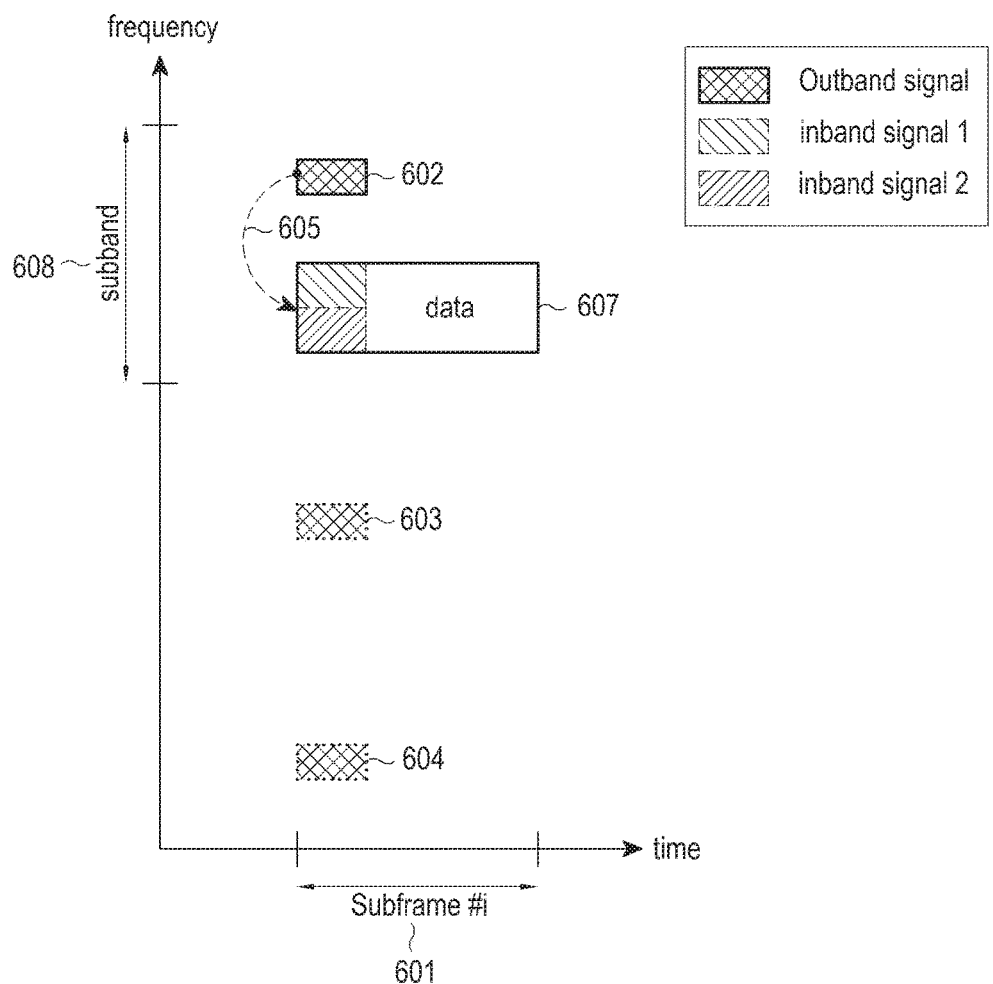
FIG. 6 illustrates a structure of an outband signal in a wireless communication system according to an embodiment of the present disclosure.

FIG. 6 illustrates an outband signal in a wireless communication system according to an embodiment of the present disclosure.

Referring to FIG. 6, an eNB defines one or more first radio resources 602, 603, and 604 for transmitting outband signals. If the eNB is initially transmit DL data to a specific UE in subframe #i 601, the eNB maps an outband signal for the UE to a part of the defined first radio resources and transmits the outband signal to the UE.

The eNB transmits an outband signal in the first radio resources 602 to a UE. The other first radio resources 603 and 604 may be used for transmitting outband signals to other UEs. The first radio resources 602 to which the outband signal is mapped may be contiguous in frequency or distributed across a total system bandwidth, as indicated by reference numeral 605.

The size and position of the first radio resources for transmitting the outband signal, an MCS used for the outband signal, and a mapping method for the outband signal may be fixed, indicated to the UE in advance by the eNB, or determined by the UE through blind decoding.

As described before, the outband signal includes resource allocation information about second radio resources 607 to which DL data and an inband signal are mapped. Since the outband signal, the DL data, and the inband signal are mapped in the same subframe, a time taken for the UE to completely decode the data is minimized.

In the case where the UE supports only a subband 608 which is a part of an ultra-wide bandwidth supported by a 5G system, only if first radio resources mapped to an outband signal transmitted to the UE by the eNB and second radio resources mapped to data and an inband signal transmitted to the UE by the eNB in the same subframe as the first radio resources are positioned within the subband 608 in the frequency domain, the UE may normally receive the outband signal, the data, and the inband signal. The size of the subband supported by the UE may be defined to be a fixed value to reduce the implementation complexity of the UE, and the position of the subband in a total system bandwidth may be variable according to a subframe.

The first radio resources 602 to which the outband signal is mapped may overlap in position with the second radio resources 607 to which the DL data and the inband signal are mapped. Only when the UE successfully receives the outband signal, the UE is able to decode the inband signal and the data. Therefore, the outband signal is mapped with priority to the overlap area between the first radio resources 602 and the second radio resources 607.

Figure 7:
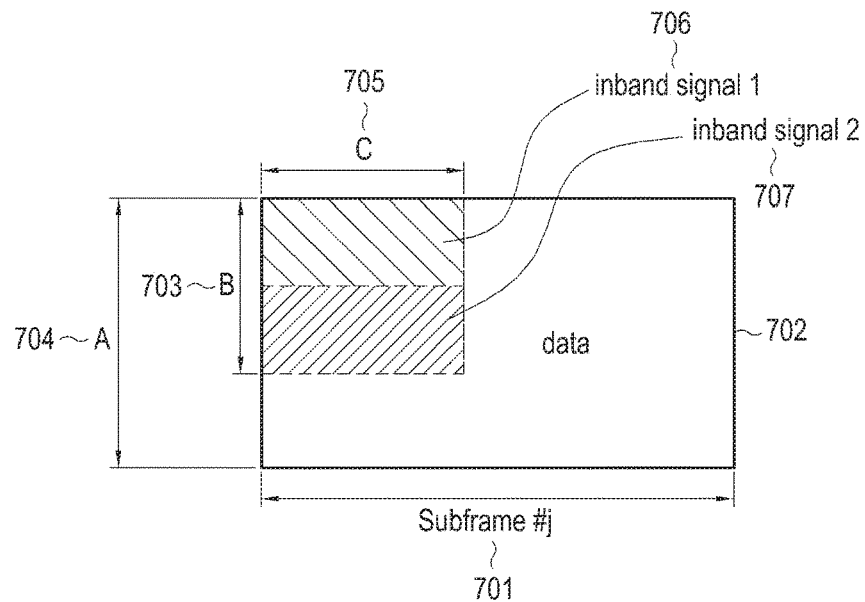
FIG. 7 illustrates a structure of an inband signal in a wireless communication system according to an embodiment of the present disclosure.

FIG. 7 illustrates an inband signal in a wireless communication system according to an embodiment of the present disclosure.

Referring to FIG. 7, as described before, the inband signal includes, for example, a first inband signal 706 and a second inband signal 707, and is mapped multiplexed with DL data transmitted to a UE in second resources 702 in a subframe #j 701.

The inband signal is mapped in time division multiplexing (TDM), starting from the start of a subframe in the second radio resources 702, so that the UE may immediately start data decoding according to control information of the inband signal after completely receiving the inband signal (after a time period C 705). Thus, a time taken for the UE to complete the data decoding is minimized. The inband signal may be mapped across the total frequency area of the second radio resources 702 (mapping method 1: a part A 704 in the example of FIG. 7) or to a partial frequency area of the second radio resources 702 (mapping method 2: a part B 703 in the example of FIG. 7). In mapping method 1, if the size of the second radio resources 702 is relatively large, the reception performance of the inband signal may be increased due to a frequency diversity gain.

The eNB may indicate a used mapping method to the UE by signaling. Or one mapping method may be fixedly predefined. Or a used mapping method may be determined implicitly from resource allocation information about the second radio resources.

The inband signal may be channel-encoded separately from the data multiplexed with the inband signal in the second radio resources (channel coding method A) or may be constructed into one transport block (TB) together with the data and then encoded (channel coding method B).

In channel coding method A, the reception performance of the inband signal and the reception performance of the data may be optimized respectively by applying MCSs required for the inband signal and the data separately. Further in channel coding method A, if the UE succeeds in decoding at least the inband signal, the UE acquires resource allocation information about second radio resources to which an inband signal and data to be received in the next subframe are mapped. Therefore, the UE does not need an additional outband signal in the subframe.

In channel coding method B, a cyclic redundancy check (CRC) for error detection is needed only for a single combined TB, thereby decreasing overhead.

The eNB may indicate a used channel coding method to the UE by signaling. Or one channel coding method may be fixedly predefined.

The first and second inband signals of the inband signal mapped and transmitted in subframe #i may be specified as follows.

1) The first inband signal includes HARQ-related control information and MCS information about data transmitted in subframe #i. The HARQ-related control information may include at least one of a new data indicator (NDI) indicating an HARQ initial transmission or an HARQ retransmission, a redundancy version (RV) of an HARQ transmission packet, and an HARQ process umber. If mapping method 2 is applied to the inband signal, the first inband signal may additionally include resource allocation control information about the data.

2) The second inband signal includes resource allocation control information about second radio resources to which data transmitted in subframe #j (j>i) is mapped, or resource allocation control information about second radio resources to which an inband signal transmitted in subframe #j is mapped. The resource allocation control information includes information about time-frequency resources.

Additionally, the second inband signal transmitted in subframe #i may include MCS information about the inband signal transmitted in subframe #j. In the absence of data to be transmitted in subframe #j to the UE, the eNB may transmit an indicator indicating the absence of data in subframe #j by the second inband signal in subframe #i.

Figure 8:
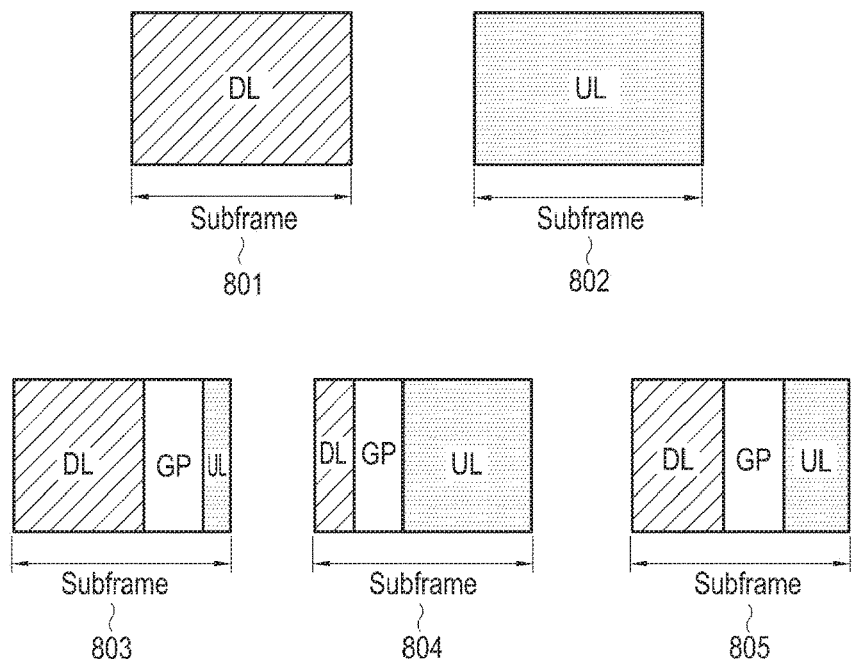
FIG. 8 illustrates a scheduling method in a time division duplex (TDD) wireless communication system according to a third embodiment of the present disclosure.

FIG. 8 illustrates a scheduling method in a TDD wireless communication system according to a third embodiment of the present disclosure.

Referring to FIG. 8, in TDD, a common frequency is used for DL and UL, and UL signal transmission/reception is distinguished from DL signal transmission/reception by time. A UL signal or a DL signal is transmitted separately on a subframe basis in TDD. Accordingly, various TDD UL-DL configurations are defined so that a time area may be divided equally into UL and DL subframes, more DL subframes may be allocated, or more UL subframe may be allocated, according to traffic loads.

To support TDD, at least three subframe formats may be defined as follows. Irrespective of the subframe formats, subframes have the same length.

1) A DL subframe is a subframe configured for DL signal transmission (801 in FIG. 8).

2) A UL subframe is a subframe configured for UL signal transmission (802 in FIG. 8).

3) A special subframe is a subframe divided into a DL transmission available period, a guard period (GP) that accommodates DL-UL transition, and a UL transmission available period.

The length of the GP may vary with a cell size supported by the system. In addition, the length of each of the DL period and the UL period may be adjusted according to the size of a DL signal or a UL signal to be accommodated in the special subframe (803, 804, and 805 in FIG. 8).

The DL period is longer than the UL period in the special subframe 803, the UL period is longer than the DL period in the special subframe 804, and the DL period is as long as the UL period in the special subframe 805.

A special subframe enables UL signal transmission corresponding to DL signal transmission in the same subframe and thus is useful in supporting an ultra-low latency service.

For example, the eNB may transmit DL data and receive an HARQ ACK/NACK feedback from the UE in the same subframe by applying the special subframe 803. The UE may secure a decoding processing time for the DL data received from the eNB during the GP. Since data generally contains more information than control information, the DL period is longer than the UL period in the special subframe 803. In another example, the eNB may schedule UL data transmission and receive the scheduled UL data from the UE in the same subframe by applying the special subframe 804. If the eNB is to transmit DL data and schedule UL data in the same subframe, the eNB may apply the special subframe 805 having the DL period and the UL period equal in length.

A scheduling method based on an outband signal and an inband signal described in the first and second embodiments of the present disclosure is also applicable to the third embodiment of the present disclosure to which TDD is applied. In TDD, a DL inband signal may further include resource allocation information about a UL signal.

Figure 9:
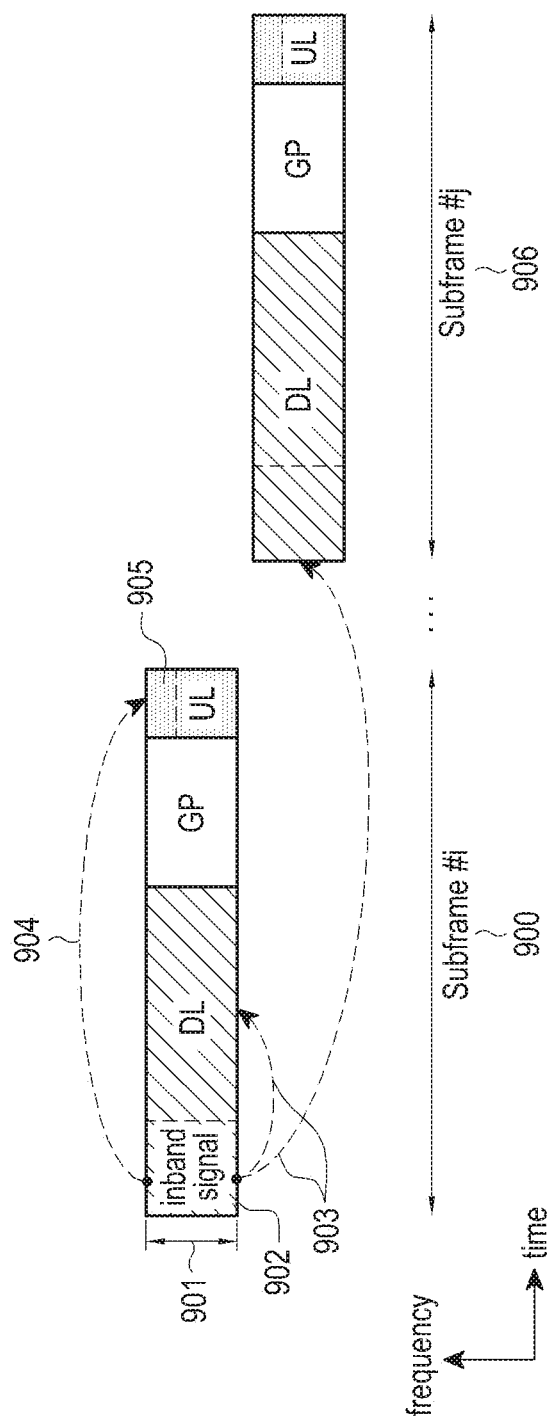
FIG. 9 is a scheduling method in TDD according to an embodiment of the present disclosure.

FIG. 9 illustrates a TDD scheduling method in a wireless communication system according to an embodiment of the present disclosure.

Referring to FIG. 9, an eNB transmits data and an inband signal 902 in second radio resources 901 during a DL period of subframe #i 900. HARQ ACK/NACK information 905 corresponding to the DL data is mapped and transmitted during a UL period of the same subframe. As described before in the second embodiment of the present disclosure, the inband signal 902 includes a first inband signal and a second inband signal, thus providing control information about DL data in subframe #i 900 and radio resource allocation information about a DL signal to be transmitted in subframe #j 906, as indicated by reference numeral 903. Additionally, the inband signal 902 may include resource allocation information about the HARQ ACK/NACK control information explicitly or indicate the resource allocation information about the HARQ ACK/NACK control information implicitly according to a predefined mapping rule, as indicated by reference numeral 904. The HARQ ACK/NACK control information is mapped within the frequency area of the second radio resources 901. While FIG. 9 is described from the perspective of DL data transmission from an eNB, the same method may be applied from the perspective of UL data scheduling.

In the case of a special subframe, radio resources may be used inefficiently due to the presence of a GP in which UL/DL signal transmission is impossible. In this case, GP overhead may be reduced through subframe concatenation in the following two methods.

Figure 10:
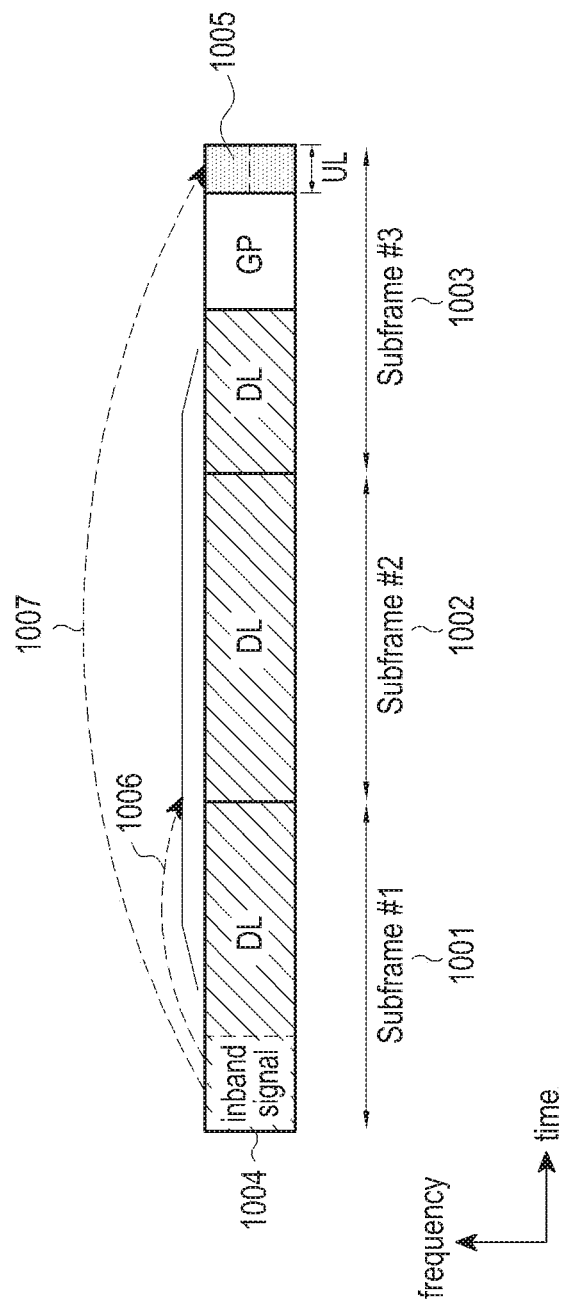
FIG. 10 is a view illustrating a first subframe concatenation method in a wireless communication system according to an embodiment of the present disclosure.

FIG. 10 illustrates a first subframe concatenation method in a wireless communication system according to an embodiment of the present disclosure.

Referring to FIG. 10, in the first subframe concatenation method, a plurality of DL subframes 1001 and 1002, and a special subframe 1003 are sequentially concatenated, occupying the same frequency area. In the example of FIG. 10, two DL subframes and one special subframe are concatenated, thus reducing a GP overhead to 1/3, compared to the case where all subframes are special subframes.

The eNB transmits an intended DL signal in the DL subframes 1001 and 1002 and the DL period of the special subframe 1003, and the UE transmits a UL control information feedback in the UL period of the special subframe 1003. The eNB provides control information about the DL data to the UE by an inband signal 1004 mapped to the start of the concatenated subframes, as indicated by reference numeral 1006. Additionally, the inband signal 1004 may include resource allocation information indicated by reference numeral 1007 about the UL control information 1005 mapped to the UL period of the special subframe among the concatenated subframes, explicitly or indicate the resource allocation information about the UL control information 1005 implicitly according to a predefined mapping rule. The UL control information is mapped within a frequency area to which the DL data is mapped. In the illustrated case of FIG. 10, since the inband signal is mapped only to the first DL subframe among the concatenated subframes, signaling overhead is reduced.

Figure 11:
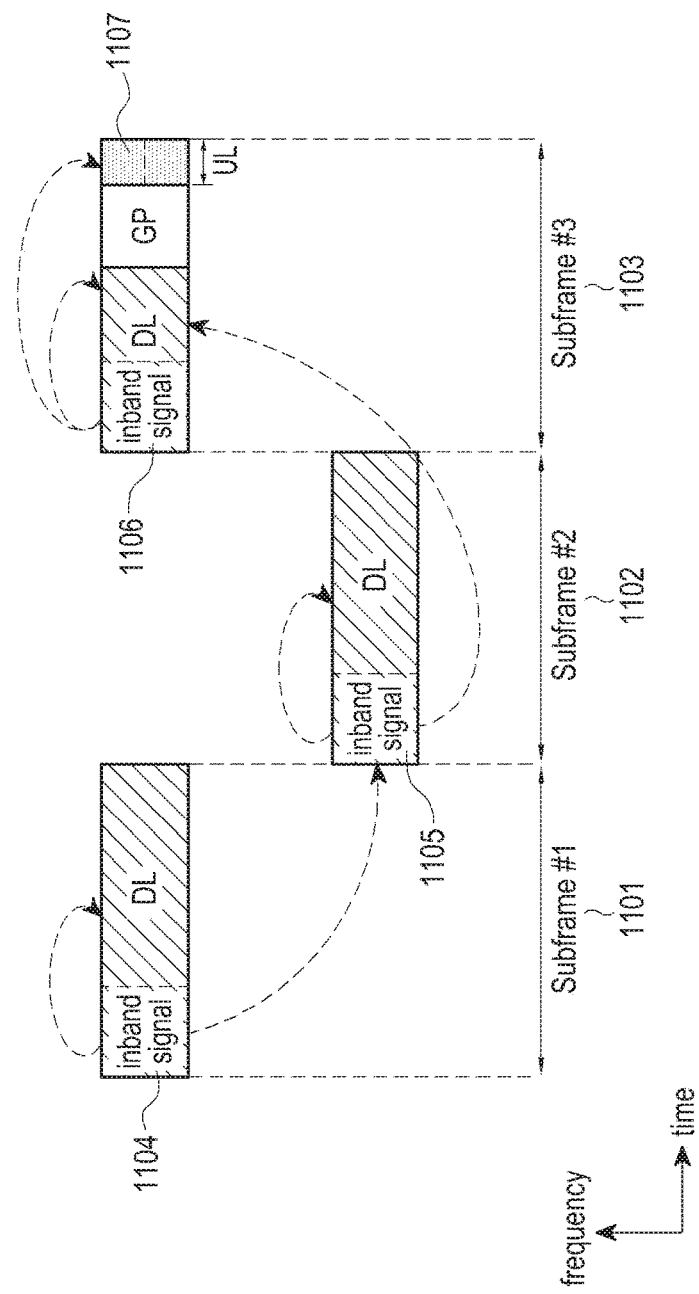
FIG. 11 is a view illustrating a second subframe concatenation method in a wireless communication system according to an embodiment of the present disclosure.

FIG. 11 illustrates a second subframe concatenation method in a wireless communication system according to an embodiment of the present disclosure.

Referring to FIG. 11, in the second subframe concatenation method, a plurality of DL subframes 1101 and 1102, and a special subframe 1103 are sequentially concatenated, occupying independent radio resources in the frequency domain. In the example of FIG. 11, two DL subframes and one special subframe are concatenated, thus reducing a GP overhead to 1/3, compared to the case where all subframes are special subframes. In the example of FIG. 11, the eNB transmits an intended DL signal in the DL subframes 1101 and 1102 and the DL period of the special subframe 1103, and the UE transmits a UL control information feedback in the UL period of the special subframe 1103. The eNB provides control information about the DL data to the UE by inband signal 1104, 1105, and 1106 mapped to the start of the respective concatenated subframes. The inband signal 1106 of the last subframe 1103 among the concatenated subframes may include resource allocation information about the UL control information 1107 mapped to the UL period of the same subframe, explicitly or indicate the resource allocation information about the UL control information 1107 implicitly according to a predefined mapping rule. The UL control information is mapped within a frequency area to which the DL data is mapped in the same subframe 1103. In the illustrated case of FIG. 11, resources may be used flexibly by an inband signal transmitted in each subframe.

The methods illustrated in FIGS. 10 and 11 are useful when an eNB has much DL data to be transmitted to a UE. If much UL transmission traffic is generated at a UE, an operation for concatenating a special subframe and a plurality of UL subframes may be defined.

Figure 12:
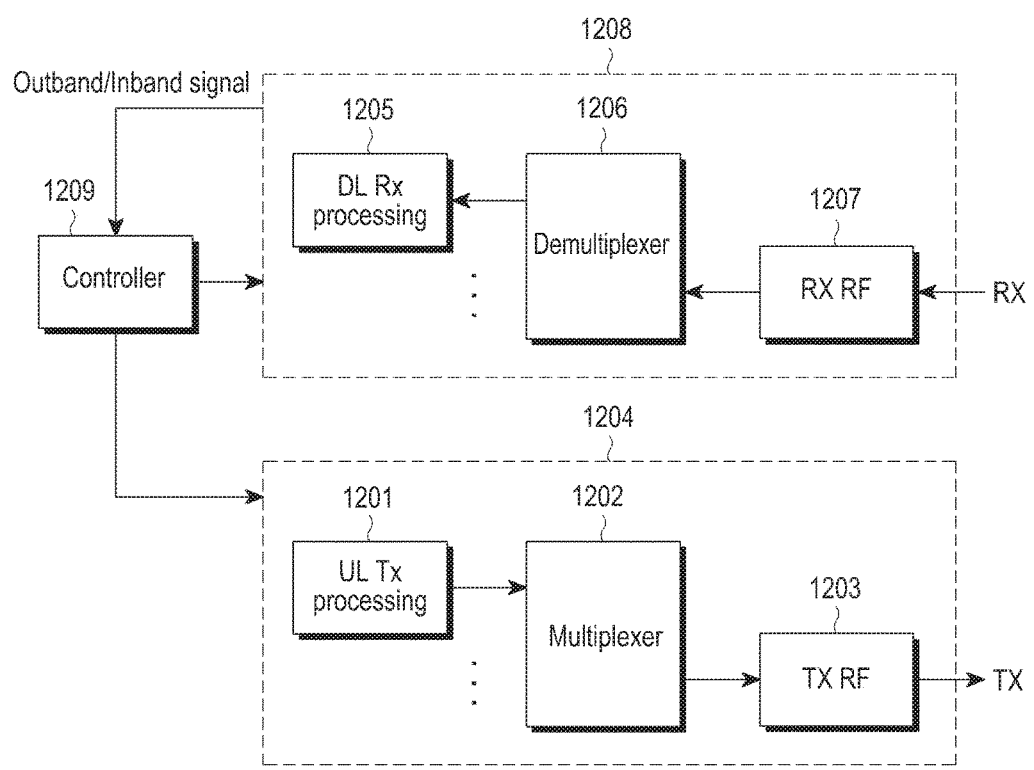
FIG. 12 is a block diagram of a transmitter and a receiver in a user equipment (UE) in a wireless communication system according to an embodiment of the present disclosure.

FIG. 12 is a block diagram of a transmitter and a receiver at a UE according to an embodiment of the present disclosure.

For the convenience of description, components that are not related directly to the present disclosure are not described and shown.

Referring to FIG. 12, a UE includes a transmitter 1204, a receiver 1208, and a controller 1209. The transmitter 1204 includes UL transmission (Tx) processors 1201, a multiplexer (MUX) 1202, and a Tx radio frequency (RF) processor 1203. The receiver 1208 includes DL reception (Rx) processors 1205, a demultiplexer (DEMUX) 1206, and an Rx RF processor 1207.

The controller 1209 controls each component of the receiver 1208 for receiving a DL signal at the UE and each component of the transmitter 1204 for transmitting a UL signal from the UE, based on an inband signal and an outband signal received from an eNB.

The controller 1209 determines in a current subframe whether an inband signal of a previous subframe has been received. If the inband signal has not been received, the controller 1209 detects an outband signal in the current subframe. If the inband signal of the previous subframe has been received, the controller 1209 controls decoding of control information of the inband signal without detecting an outband signal.

The UL Tx processors 1201 of the transmitter 1204 generates an intended Tx signal by performing processes such as channel coding and modulation. The MUX 1202 multiplexes the signals generated from the UL Tx processors 1201 with other UL signals. The Tx RF processor 1203 processes the multiplexed signal and transmits the processed signal to the eNB.

The receiver 1208 of the UE demultiplexes a signal received from the eNB and distributes the demultiplexed signals to the respective DL Rx processors 1205. The DL Rx processors 1205 perform processes on the DL signal of the eNB, such as demodulation and channel decoding, thus acquiring control information or data transmitted by the eNB. The receiver 1208 supports an operation of the controller 1209 by applying the output of the DL Rx processors 1205 to the controller 1209.

As is apparent from the foregoing description, since a scheduling method for a UE in a wireless communication system is defined, the present disclosure provides forward compatibility and simplifies transmission and reception timings, thereby reducing the complexity of UE and system implementation.

The present disclosure may prevent an overhead increase in a wireless communication system.

The present disclosure may reduce the reception complexity of a UE in a wireless communication system.

The method and apparatus for scheduling data in a wireless communication system according to an embodiment of the present disclosure may be implemented in hardware, software, or a combination of hardware and software. The software may be stored, for example, irrespective of erasable or rewritable, in a volatile or non-volatile storage device such as a storage device like read-only memory (ROM), a memory such as random access memory (RAM), a memory chip, or an integrated circuit (IC), or an optically or magnetically writable and machine-readable (for example, computer-readable) storage medium such as compact disc (CD), digital versatile disc (DVD), or magnetic tape. The method for scheduling data in a wireless communication system according to the embodiment of the present disclosure may be implemented by a computer or a portable terminal including a controller and/or at least one processor and a memory. The memory is an example of a machine-readable storage medium suitable for storing a program or programs including instructions that implement embodiments of the present disclosure.

Accordingly, the present disclosure includes a program including code for implementing the apparatus or method as disclosed in the claims and a machine-readable storage medium that stores the program. Also, this program may be electronically transferred through a medium such as a communication signal transmitted by wired or wireless connection and the present disclosure includes its equivalents appropriately.

The apparatus for scheduling data in a wireless communication system according to an embodiment of the present disclosure may receive a program from a wiredly or wirelessly connected program providing device and store the program. The program providing device may include a program having instructions for controlling a program processing device to implement the data scheduling method in a predetermined wireless communication system, a memory for storing information needed for the scheduling method, a communication unit for conducting wired or wireless communication with the program processing device, and a controller for transmitting the program upon request of the program processing device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a terminal for communicating in a wireless communication system, the method comprising:
receiving first control information mapped on a resource predetermined between the terminal and a base station;
identifying, based on the first control information, a first block in a first subframe, wherein the first block comprises second control information and first data; and
decoding, based on the second control information, the first data in the first subframe,
wherein the first control information comprises resource allocation information related to the first block, and
wherein the second control information comprises resource allocation information related to a second block in a second subframe.

2. The method of claim 1,
wherein a resource mapped to the first control information is different from a resource mapped to the first block, and
wherein the first control information is received from an outband signal.

3. The method of claim 1, further comprising:
identifying, based on the resource allocation information related to the second block indicated by the first subframe, the second block in the second subframe, wherein the second block comprises third control information and second data; and
decoding, based on the third control information, the second data,
wherein the third control information comprises resource allocation information related to a third block in a third subframe.

4. The method of claim 1, further comprising:
determining, in the second subframe, whether the resource allocation information related to the second block indicated by the first subframe, exists;
if the resource allocation information related to the second block indicated by the first subframe does not exist, acquiring, the resource allocation information related to the second block in the second subframe;
if the resource allocation information related to the second block indicated by the first subframe exists, identifying, based on the resource allocation information related to the second block indicated by the first subframe, the second block in the second subframe, wherein the second block comprises third control information and second data; and decoding the second data based on the third control information in the second subframe.

5. The method of claim 1,
wherein the second control information further comprises channel state information about the first data, and
wherein the channel state information about the first data comprises at least one of hybrid automatic repeat request (HARQ)-related control information or modulation and coding scheme (MCS) information.

6. The method of claim 1, wherein the first control information and the second control information are mapped within a specific subband.

7. The method of claim 1, wherein the first control information is mapped contiguously in a frequency area or distributed across a total system bandwidth.

8. The method of claim 1, wherein in time division duplex, the second control information transmitted on a downlink comprises resource allocation information related to an uplink signal.

9. The method of claim 8,
wherein the first subframe is configured based on one of a scheme of configuring subframes by sequentially concatenating a plurality of downlink subframes and a special subframe, a scheme of configuring subframes by allocating same radio resources in frequency to the subframes, or a scheme of configuring subframes by allocating independent radio resources in frequency to the subframes, and
wherein the special subframe comprises a downlink transmission available period, a guard period for accommodating downlink to uplink transition, and an uplink transmission available period.

10. The method of claim 1, wherein the first block is channel-encoded based on one of a scheme of channel-encoding the second control information and the first data jointly, or a scheme of channel-encoding the second control information and the first data separately.

11. A terminal for communicating in a wireless communication system, the terminal comprising:
a transceiver; and
at least one processor coupled with the transceiver and configured to:
receive first control information mapped on a resource predetermined between the terminal and a base station,
identify, based on the first control information, a first block in a first subframe, wherein the first block comprises second control information and first data, and
decode, based on the second control information, the first data in the first subframe,
wherein the first control information comprises resource allocation information related to the first block, and
wherein the second control information comprises resource allocation information related to a second block in a second subframe.

12. The terminal of claim 11,
wherein a resource mapped to the first control information is different from a resource mapped to the first block, and
wherein the first control information is received from an outband signal.

13. The terminal of claim 11, wherein the at least one processor is further configured to:
identify, based on the resource allocation information related to the second block indicated by the first subframe, the second block in the second subframe, wherein the second block comprises third control information and second data, and
decode, based on the third control information, the second data,
wherein the third control information comprises resource allocation information related to a third block in a third subframe.

14. The terminal of claim 11, wherein the at least one processor is further configured to:
determine, in the second subframe, whether the resource allocation information related to the second block indicated by the first subframe, exists,
if the resource allocation information related to the second block indicated by the first subframe does not exist, acquire, the resource allocation information related to the second block in the second subframe,
if the resource allocation information related to the second block indicated by the first subframe exists, identify, based on the resource allocation information related to the second block indicated by the first subframe, the second block in the second subframe, wherein the second block comprises third control information and second data, and
decode the second data based on the third control information in the second subframe.

15. The terminal of claim 11,
wherein the second control information further comprises channel state information about the first data, and
wherein the channel state information about the first data comprises at least one of hybrid automatic repeat request (HARQ)-related control information or modulation and coding scheme (MCS) information.

16. The terminal of claim 11, wherein the first control information and the second control information are mapped within a specific subband.

17. The terminal of claim 11, wherein the first control information is mapped contiguously in a frequency area or distributed across a total system bandwidth.

18. The terminal of claim 11, wherein in time division duplex, the second control information transmitted on a downlink comprises resource allocation information related to an uplink signal.

19. The terminal of claim 18,
wherein the first subframe is configured based on one of a scheme of configuring subframes by sequentially concatenating a plurality of downlink subframes and a special subframe, a scheme of configuring subframes by allocating same radio resources in frequency to the subframes, or a scheme of configuring subframes by allocating independent radio resources in frequency to the subframes, and
wherein the special subframe comprises a downlink transmission available period, a guard period for accommodating downlink to uplink transition, and an uplink transmission available period.

20. The terminal of claim 11, wherein the first block is channel-encoded based on one of a scheme of channel-encoding the second control information and the first data jointly, or a scheme of channel-encoding the second control information and the first data separately.

* * * * *